United States Patent
Nakano et al.

(10) Patent No.: US 10,406,469 B2
(45) Date of Patent: Sep. 10, 2019

(54) ELECTRET FIBER SHEET

(71) Applicant: TORAY INDUSTRIES, INC., Tokyo (JP)

(72) Inventors: Yohei Nakano, Otsu (JP); Yuji Iyama, Otsu (JP); Takuji Kobayashi, Otsu (JP)

(73) Assignee: TORAY INDUSTRIES, INC., Tokyo (JP)

( * ) Notice: Subject to any disclaimer, the term of this patent is extended or adjusted under 35 U.S.C. 154(b) by 116 days.

(21) Appl. No.: 15/558,010

(22) PCT Filed: Mar. 2, 2016

(86) PCT No.: PCT/JP2016/056374
§ 371 (c)(1),
(2) Date: Sep. 13, 2017

(87) PCT Pub. No.: WO2016/147866
PCT Pub. Date: Sep. 22, 2016

(65) Prior Publication Data
US 2018/0043294 A1    Feb. 15, 2018

(30) Foreign Application Priority Data
Mar. 16, 2015  (JP) .................. 2015-051857

(51) Int. Cl.
*B01D 53/02*   (2006.01)
*B01D 46/00*   (2006.01)
(Continued)

(52) U.S. Cl.
CPC ..... *B01D 46/0032* (2013.01); *B01D 39/1623* (2013.01); *B01D 46/0001* (2013.01);
(Continued)

(58) Field of Classification Search
CPC .... B01D 2239/0208; B01D 2239/0435; B01D 2239/10; B01D 2239/1233;
(Continued)

(56) References Cited

U.S. PATENT DOCUMENTS 6,119,691 A * 9/2000 Angadjivand ....... D04H 1/4382
128/205.29
2003/0207635 A1* 11/2003 Minemura ......... B01D 39/1623
442/327
(Continued)

FOREIGN PATENT DOCUMENTS

JP    2010-17703 A    1/2010
JP    2010-234285 A   10/2010

OTHER PUBLICATIONS

Translation of JP2010-17703 A; Otsuka; Jan. 2010.*
(Continued)

*Primary Examiner* — Christopher P Jones
(74) *Attorney, Agent, or Firm* — Birch, Stewart, Kolasch & Birch, LLP

(57) ABSTRACT

Problem: The present invention allows a fiber sheet to be densely charged with electric charge and provides an electret fiber sheet that has excellent dust-collecting characteristics. Solution: The electret fiber sheet according to the present invention is an electret fiber sheet in which the relationship between a* and b* measured by a spectrophotometer when a red positive charge toner and a blue negative charge toner are attached to the sheet satisfies the expression: $[12 \leq \{-(b^*)-(a^*)\}_{Ave} \leq 50]$.

4 Claims, 1 Drawing Sheet

(51) Int. Cl.
  *D06M 10/00* (2006.01)
  *B01D 39/16* (2006.01)
  *B01D 46/10* (2006.01)
  *B03C 3/47* (2006.01)
  *B03C 3/60* (2006.01)
  *B01D 39/14* (2006.01)

(52) U.S. Cl.
  CPC ............... *B01D 46/10* (2013.01); *B03C 3/47* (2013.01); *B03C 3/60* (2013.01); *D06M 10/00* (2013.01); *B01D 39/14* (2013.01); *B01D 2239/0208* (2013.01); *B01D 2239/0435* (2013.01); *B01D 2239/10* (2013.01); *B01D 2239/1233* (2013.01); *B01D 2239/1291* (2013.01); *B01D 2279/40* (2013.01)

(58) Field of Classification Search
  CPC ........ B01D 2239/1291; B01D 2279/40; B01D 39/14; B01D 39/1623; B01D 46/0001; B01D 46/0032; B01D 46/10; B03C 3/47; B03C 3/60; D06M 10/00
  See application file for complete search history.

(56) References Cited

U.S. PATENT DOCUMENTS

| | | | |
|---|---|---|---|
| 2006/0254419 A1* | 11/2006 | Leonard | H01G 7/02 95/57 |
| 2007/0215008 A1* | 9/2007 | Schweikart | C09B 67/0046 106/496 |
| 2014/0123854 A1* | 5/2014 | Leonard | B03C 3/30 96/28 |
| 2016/0175753 A1* | 6/2016 | Hidaka | B03C 3/28 96/135 |
| 2017/0033276 A1* | 2/2017 | Kou | G06F 3/041 |

OTHER PUBLICATIONS

International Search Report, issued in PCT/JP2016/056374, PCT/ISA/210, dated May 24, 2016.

Written Opinion of the International Searching Authority, issued in PCT/JP2016/056374, PCT/ISA/237, dated May 24, 2016.

* cited by examiner

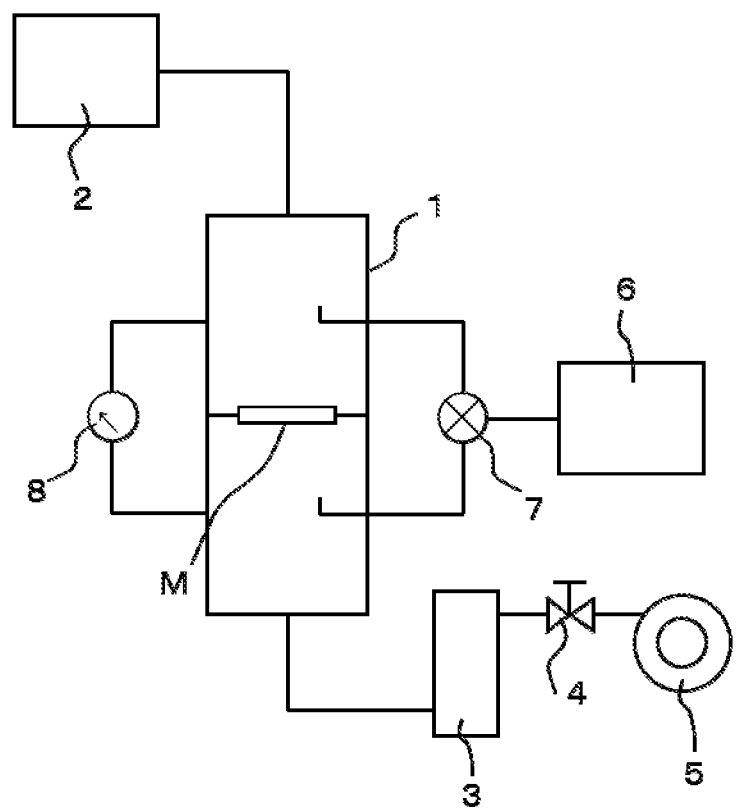

ELECTRET FIBER SHEET

TECHNICAL FIELD

The present invention relates to electretized fiber sheets. More specifically, the present invention relates to electret fiber sheets that achieve a charge distribution which is significantly different from one obtained by a conventional hydrocharging method and which is, in other words, a charge distribution having positive polarity charge unevenly distributed so as to be denser toward the surface in the fiber sheet, and that have excellent dust-collecting characteristics.

BACKGROUND ART

Electretized fiber sheets are widely used because they exhibit high dust-collecting performance with low pressure loss when used as air filters. As a method for producing such electret fiber sheets, a method in which a high voltage is applied to fiber sheets such as a nonwoven web that are made of synthetic fiber and thus the fiber sheets are electretized by corona discharge is proposed (see Patent Literature 1).

Electret fiber sheets produced by this corona discharge method exhibit higher dust-collecting performance compared with fiber sheets that are not electretized. However, the method for producing electret fiber sheets by the corona discharge method is a production method in which mainly only the surface of a fiber sheet is electrically charged and which leaves it difficult to charge the inside of the fiber sheet with electric charge, and thus it is difficult to say that the method achieves sufficient electretization.

In view of this, as electretization methods to solve such a problem, methods in which to electrically charge a fiber by subjecting it to water contact have been proposed. Specifically, proposed are: a method in which a fiber sheet to be used is electretized by impinging on the whole surface of the fiber sheet high pressure water spouted from a mouthpiece of a so-called water jet punch (WJP) in which the spinning nozzle has holes arranged in line at narrow spacings, such that the fiber sheet has positive polarity charge and negative polarity charge evenly mixed (see Patent Literature 2); and a so-called hydrocharging method such as a method in which a fiber sheet is passed over a nozzle having a slit shape while the nozzle sucks water to thereby allow the water to permeate into the fiber sheet, such that the fiber sheet has positive polarity charge and negative polarity charge evenly mixed (see Patent Literature 3).

CITATION LIST

Patent Literature

Patent Literature 1: JP 61-102476 A
Patent Literature 2: U.S. Pat. No. 6,119,691 A
Patent Literature 3: JP 2003-3367 A

SUMMARY OF INVENTION

Technical Problem

It is true that a fiber sheet obtained by the hydrocharging method can be electrically charged throughout the fiber sheet because even the fiber in the inside of the fiber sheet is subjected to water contact. Under the current circumstances, however, a fiber sheet cannot be densely charged with positive polarity charge and negative polarity charge even by using the hydrocharging method.

In view of problems of conventional electret technologies, an object of the present invention is to provide an electret fiber sheet that is formed by densely charging a fiber sheet with electric charge and has excellent dust-collecting characteristics.

Solution to Problem

The inventors have intensively studied these problems and have consequently come to the present invention by finding out that a fiber sheet obtained by a conventional hydrocharging method has positive polarity charge and negative polarity charge evenly mixed in the surface of the fiber sheet, hence is likely to cause neutralization to the electric charges, and fails to charge the fiber sheet with dense electric charge.

The present invention intends to solve the above-described problems, and the electret fiber sheet according to the present invention is an electret fiber sheet in which an average of $-(b^*)-(a^*)$ values satisfies the following expression:

$$12 \leq [-(b^*)-(a^*)]_{Ave} \leq 50$$

wherein $a^*$ and $b^*$ are values measured by a spectrophotometer when a red positive charge toner and a blue negative charge toner are attached.

In a preferred aspect of the electret fiber sheet according to the present invention, the electret fiber sheet to which the red positive charge toner and the blue negative charge toner are attached is such that the maximum $[-(b^*)-(a^*)]_{Max}$ of the $[-(b^*)-(a^*)]$ values measured by a spectrophotometer is 18 or more, the average $a^*_{Ave}$ of the $a^*$ values is in the range of 0 to 10, the average $b^*_{Ave}$ of the $b^*$ values is in the range of $-40$ to $-20$, the maximum $a^*_{Max}$ of the $a^*$ values is in the range of 5 to 18, and the minimum $b^*_{Min}$ of the $b^*$ values is in the range of $-40$ to $-20$.

The electret fiber sheet according to the present invention is produced by an electretizing method comprising a spraying step of impinging jets of water or a stream of water droplets on a non-conductive fiber sheet.

Advantageous Effects of Invention

The present invention can afford electret fiber sheets that achieve a charge distribution which is significantly different from one obtained by conventional hydrocharging methods and which is, in other words, a charge distribution having positive polarity charge unevenly distributed so as to be denser toward the surface in the fiber sheet, and that have excellent dust-collecting characteristics.

BRIEF DESCRIPTION OF DRAWINGS

FIG. 1 is a schematic side view illustrating a measurement device for measuring collecting properties and pressure loss.

DESCRIPTION OF EMBODIMENTS

The electret fiber sheet according to the present invention is an electret fiber sheet in which the relationship between $a^*$ and $b^*$ measured by a spectrophotometer when a red positive charge toner and a blue negative charge toner are attached to the sheet satisfies the expression: $[12 \leq \{-(b^*)-(a^*)\}_{Ave} \leq 50]$.

As used herein, a* and b* refer to a* and b* in the "L*a*b* colorimetric system" standardized by International Commission on Illumination (CIE).

The electret fiber sheet according to the present invention is a fiber sheet made of a fiber material having non-conductivity. Examples of such fiber sheets include those fabrics, knitting, and nonwoven webs, and the like that are made of synthetic fiber. For air filters, in particular nonwoven webs composed of synthetic fiber are preferable, and, among others, melt blown fiber nonwoven webs are preferably used.

The non-conductivity as mentioned herein is an aspect in which volume resistivity is preferably $10^{12}$·Ω·cm or more, more preferably $10^{14}$·Ω·cm or more.

Examples of such fiber materials include fiber materials composed of, for example: polyolefins such as polyethylene and polypropylene; polyesters such as polyethylene terephthalate and polylactic acid; thermoplastic resins such as polycarbonate, polystyrene, polyphenylene sulfide, and polytetrafluoroethylene; mixtures thereof; and the like.

Among these thermoplastic resins, fiber materials mainly made of polyolefin are preferable and in particular fiber materials mainly made of polypropylene are preferably used, from the viewpoint of electret properties.

In a preferred aspect of the fiber sheet composed of a non-conductive fiber material used in the present invention, at least one from among hindered amine additives and/or triazine additives is blended in the fiber material.

Containing such an additive in a fiber material constituting a non-conductive fiber sheet enables the fiber sheet to retain particularly high electret performance.

Among the above-described two kinds of additives, examples of hindered amine compounds include poly[(6-(1,1,3,3-tetramethylbutyl)imino-1,3,5-triazine-2,4-diyl)((2,2,6,6-tetramethyl-4-piperidyl)imino)hexamethylene((2,2,6,6-tetramethyl-4-piperidyl)imino)] ("CHIMASSORB" (registered trademark) 944LD, manufactured by BASF Japan Ltd.), a polycondensate of dimethyl succinate with 1-(2-hydroxyethyl)-4-hydroxy-2,2,6,6-tetramethylpiperidine ("TINUVIN" (registered trademark) 622LD, manufactured by BASF Japan Ltd.), bis(1,2,2,6,6-pentamethyl-4-piperidyl)-2-(3,5-di-t-butyl-4-hydroxybenzyl)-2-n-butylmalonate ("TINUVIN" (registered trademark) 144, manufactured by BASF Japan Ltd.), and the like.

In addition, examples of triazine additives include poly [(6-(1,1,3,3-tetramethylbutyl)imino-1,3,5-triazine-2,4-diyl) ((2,2,6,6-tetramethyl-4-piperidyl)imino)hexamethylene((2,2,6,6-tetra methyl-4-piperidyl)imino)] ("CHIMASSORB" (registered trademark) 944LD, manufactured by BASF Japan Ltd.), 2-(4,6-diphenyl-1,3,5-triazine-2-yl)-5-((hexyl) oxy)-phenol ("TINUVIN" (registered trademark) 1577FF, manufactured by BASF Japan Ltd.), and the like.

Among these additives, hindered amine additives are preferably used, and in particular poly [(6-(1,1,3,3-tetramethylbutyl)imino-1,3,5-triazine-2,4-diyl) ((2,2,6,6-tetramethyl-4-piperidyl)imino)hexamethylene((2,2,6,6-tetramethyl-4-piperidyl)imino)] ("CHIMASSORB" (registered trademark) 944LD, manufactured by BASF Japan Ltd.) is preferably used.

The addition amount of the above-described hindered amine additive or triazine additive is preferably 0.5 to 5 mass %, more preferably 0.7 to 3 mass %. The addition amounts in these ranges can afford excellent dust-collecting characteristics to electretized fiber sheets.

Other than the above-described additives, those additives, such as heat stabilizers, weathering agents, and polymerization inhibitors, that are generally used for non-conductive fiber sheets of electretized products can be added to non-conductive fiber sheets used in the present invention.

In a preferred aspect, an electretizing method used in the production of the electret fiber sheet according to the present invention is carried out by impinging jets of water or a stream of water droplets spouted from a nozzle on a non-conductive fiber sheet in an environment in which misty water is present. As used herein, misty water refers to floating fine water droplets.

When a non-conductive fiber sheet is processed by a common hydrocharging method, the fiber sheet exhibits a charge distribution having evenly mixed positive polarity and negative polarity as in a conventional technology, whereas a method carried out in an environment in which misty water is present allows the misty water to be attached to the surface of a non-conductive fiber sheet and can achieve a charge distribution having positive polarity charge unevenly distributed toward the surface in the non-conductive fiber sheet. Thus, by impinging jets of water or a stream of water droplets in an environment in which misty water is present, floating fine water droplets coming in contact with the atmosphere are charged with negative polarity, although it is unclear why the positive polarity charge is unevenly distributed, and it is then conceivable that these floating fine water droplets charged with negative polarity are attached to the surface of a non-conductive fiber sheet and thereby charge the surface side of the fiber sheet with positive polarity charge. In addition, because the surface of the fiber sheet is charged with positive polarity charge, negative polarity charge moves as a compensation charge toward the internal layer of the fiber sheet, the charges are stratified in layers from positive polarity to negative polarity to positive polarity in the thickness direction, and thus the fiber sheet can be densely charged with electric charge.

A charge distribution in the electret fiber sheet according to the present invention is visualized by attaching a red positive charge toner and a blue negative charge toner to the fiber sheet. A method for attaching a red positive charge toner and a blue negative charge toner to a fiber sheet is carried out through the procedures based on the following (1) to (5). This series of procedures is preferably carried out in an environment having a humidity of 50% or less.

(1) Powder toner (purple color) is made by mixing equal amounts of the following red positive charge toner and blue negative charge toner that are used for color copying machines.

red toner: IKT-821-2M (available from IKK Trading Co., Ltd.)

blue toner: ART CYAN TONER (available from IMEX Co., Ltd.)

(2) The powder toner is placed on a plain-weave metal gauze having a mesh size of 100, and the plain-weave metal gauze is vibrated above a fiber sheet so that the powder toner can be sprinkled over the fiber sheet until the body of the fiber sheet becomes invisible. In this case, there should not be any action such as pressing or rubbing the toner against the fiber sheet by giving pressure with a hand or an object (such as an iron plate).

(3) A corner of the fiber sheet is lifted and shaken up and down about 20 times to drop remaining excess powder toner.

(4) The procedures of the above-described (2) and (3) are repeated three times in total.

(5) The fiber sheet is set on a laminating pouch film (part number FCP10216303 (available from Fujipla Inc.)), and they are adhered together using a pouch laminater (part number DS320P (available from GBC Japan K.K.)) with the output dial set at a value of 1.

A toner distribution carried out by the above-described method corresponds to the electric charge that the fiber sheet has, so that when the fiber has negative polarity charge, red toner is attach to the fiber sheet, and when the fiber has positive polarity charge, blue toner is attached to the fiber sheet. In addition, the larger the amount of electric charge is, the more toner corresponding to the polarity of the charge is attached, and the thicker the color shade is.

For the electret fiber sheet according to the present invention, it is important that the relationship between a* and b* measured by a spectrophotometer when a red positive charge toner and a blue negative charge toner are attached to the sheet satisfies the following expression:

$$12 \leq [-(b^*)-(a^*)]_{Ave} \leq 50.$$

In the present invention, the average of $-(b^*)-(a^*)$ values is 12 or more, preferably 15 or more, in which a* and b* are measured by a spectrophotometer when a red positive charge toner and a blue negative charge toner are attached to the electret fiber sheet. Further, the maximum of the $-(b^*)-(a^*)$ values is 18 or more, preferably 20 or more. By having these values for the characteristic value $[-(b^*)-(a^*)]$ obtained from a* and b*, the fiber sheet has positive polarity charge unevenly distributed so as to be denser toward the surface in the fiber sheet and can obtain excellent dust-collecting characteristics. In addition, the upper limit of the characteristic value $[-(b^*)-(a^*)]$ obtained from a* and b* is 50, preferably 40, more preferably 30.

In a preferred aspect of the electret fiber sheet according to the present invention to which a red positive charge toner and a blue negative charge toner are attached, the average $a^*_{Ave}$ of the a* values is in the range of 0 to 10, the average $b^*_{Ave}$ of the b* values is in the range of −40 to −20, the maximum $a^*_{Max}$ of the a* values is in the range of 5 to 18, and the minimum $b^*_{Min}$ of the b* values is in the range of −40 to −20, as measured by a spectrophotometer.

In the present invention, more preferably, the average $a^*_{Ave}$ of the a* values is in the range of 4 to 10, and the average $b_A$ the b* values is in the range of −35 to −20, as measured by the spectrophotometer. More preferably, the maximum $a^*_{Max}$ of the a* values is 5 to 15, and the minimum $b^*_{Min}$ of the b* values is −35 to −22, and further preferably, the $a^*_{Max}$ is 8 to 15 and the $b^*_{Min}$ is −30 to −24. By having these values, the fiber sheet can have positive polarity charge unevenly distributed so as to be denser toward the surface in the fiber sheet and obtain excellent dust-collecting characteristics.

A fiber constituting the electret fiber sheet according to the present invention preferably has an average diameter of single fiber in the range of 0.1 to 8.0 μm. By having an average diameter of single fiber of preferably 0.1 to 8.0 μm, more preferably 0.3 to 7.0 μm, further preferably 0.5 to 5.0 μm, electret fiber sheets having excellent breathability and dust-collecting characteristics can be obtained.

In addition, the electret fiber sheet according to the present invention preferably has a mass per unit area in the range of 3 to 100 g/m². By having a mass per unit area of 3 to 100 g/m², preferably 5 to 70 g/m², more preferably 10 to 50 g/m², electret fiber sheets having excellent breathability and dust-collecting characteristics can be obtained.

Next, a preferable electretizing method used in producing the electret fiber sheet according to the present invention will be described.

An electretizing method used in the present invention undergoes: a spraying step of impinging jets of water or a stream of water droplets on a non-conductive fiber sheet at a pressure sufficient to impart electric charge in an environment in which misty water is present; a dehydrating step; and a drying step.

Water used as jets of water or a stream of water droplets used in the spraying step in the present invention is preferably water that has been rid of dirt with a liquid filter and the like and that is as clean as possible. In particular, pure water such as ion-exchanged water, distilled water, and filtrate water that has passed through a reverse osmosis membrane is preferably used. In addition, the level of pure water is preferably $10^3$ μS/m or less, further preferably $10^2$ μS/m or less, in terms of conductivity. In addition, the above-described water can be mixed with a water-soluble organic solvent to the extent that the collecting characteristics of the fiber sheet is not adversely affected.

As a method for producing misty water, a method in which to produce misty water at the same time as jets of water or a stream of water droplets spouted from a nozzle is sprayed against the sheet is preferable in terms of economy. For example, it is possible that jets of water or a stream of water droplets is spouted from a nozzle at a high pressure and with a shorter distance between the nozzle spouting face and the fiber sheet surface, whereby the water is impinged on the fiber sheet and microdispersed in mist form at the same time, thus producing an environment of water mist.

For those nozzles used in the present invention that spout jets of water or a stream of water droplets, nozzle of various shapes such as a circle, a hollow circle, and an ellipse can be applied.

In addition, the spraying angle of a nozzle is preferably 10 to 150°, more preferably 15 to 120°, further preferably 20 to 90°. Having a spraying angle of 10 to 150° is a preferable aspect, because it makes it possible to maintain the impinging force during spraying even when the water particle size is made smaller, and because the water particle size made smaller facilitates the microdispersion of the water when the water is impinged on the sheet. On the other hand, the use of a so-called WJP spinning nozzle, which does not have a spraying angle, is not preferable. This is because the use of a WJP spinning nozzle causes water to be spouted in the shape of a continuous column and hence is likely to damage the fiber, and because the continuous columnar stream makes it more difficult for the water to be microdispersed when impinged on the fiber sheet.

The spouting pressure is preferably a pressure that can impart electric charge to a non-conductive fiber sheet and microdisperse water when the water is impinged on the fiber sheet. The pressure is preferably 0.5 to 6.0 MPa, more preferably 1.0 to 5.0 MPa, further preferably 2.0 to 5.0 MPa. By having a spouting pressure of 0.5 to 6.0 MPa, the jets of water or the stream of water droplets can create an environment of misty water while inhibited from damaging the sheet, and can afford electret fiber sheets having excellent collecting characteristics.

In addition, the distance between the nozzle spouting face and the fiber sheet surface is preferably 20 to 100 mm, more preferably 30 to 70 mm, further preferably 40 to 60 mm. By having a distance of 20 to 100 mm between the nozzle spouting face and the fiber sheet surface, the water can create an environment of misty water while inhibited from damaging the fiber sheet, and can afford electret fiber sheets having excellent collecting characteristics.

In addition, it is preferable that an iron plate, a fine-meshed metal gauze, or the like be placed under the fiber sheet to help to microdisperse water when the nozzle spouts the water against the fiber sheet.

In a preferred aspect according to the present invention, a non-conductive fiber sheet undergoes a dehydrating step for dehydration treatment after jets of water or a stream of water droplets is spouted against the sheet. A dehydrating means can be carried out by, for example, nip rolling, using water absorbent rolls, sucking with a suction nozzle, and the like. The dehydration is useful because it can enhance drying efficiency in the subsequent drying step.

In the present invention, any conventionally known drying method can be used as a drying method in the drying step. For example, hot-air drying, vacuum drying, air-drying, and the like can be applied. Among others, hot-air drying is a preferred aspect because it enables continuous treatment. When a hot-air drying method is adopted, the drying temperature needs to be such a temperature as not to deactivate an electret.

The non-conductive fiber sheet is preferably dried until the moisture included in the non-conductive fiber sheet reaches an official moisture regain. In addition, the drying temperature is preferably 130° C. or less, more preferably 120° C. or less, further preferably 100° C. or less. The fiber sheet is preferably discharged from a drier immediately after drying so that its electret effect cannot be deactivated, and, for example, in a preferred aspect, the fiber sheet is discharged within 30 minutes when the drying temperature is 100° C. or more.

The electret fiber sheet according to the present invention can be preferably used as a filter medium for filters. The filter medium is suitable for air filters in general and is especially suitable for high-performance applications such as filters for air conditioners, filters for air cleaners, and automotive cabin filters, but the range of application of the filter medium is not limited thereto.

EXAMPLES (1) Average Diameter of Single Fiber

For an average diameter of single fiber, 10 measurement samples each 1 cm×1 cm were cut out of an arbitrary area of a nonwoven web, the fiber surfaces of the samples were observed with a scanning electron microscope adjusted at a magnification of 1000 to 3000 times, and one photograph was taken for each sample (10 photographs in total). All the fibers whose diameters were clearly observed in the photographs were measured (200 points), and the averaged value was taken as an average diameter of fiber.

(2) Average, Maximum, and Minimum of a*, b*, and Characteristic Values:

By the above-described method, samples with toners attached thereto (having a size of 8 cm in length×25 cm in width) were made, a 20 cm width in the center of each sample was continuously measured for a* and b* at 5 mm intervals in the width direction using a spectrophotometer (Spectrophotometer CM3700D (manufactured by Minolta Co., Ltd.)), and the characteristic values were calculated by the undermentioned [expression]. From the data for the 40 points measured, the average $[-(b^*)-(a^*)]_{Ave}$ and the maximum $[-(b^*)-(a^*)]_{Max}$ of the characteristic values were determined. From the data for the 40 points measured, the average $a^*_{Ave}$ and the maximum $a^*_{Max}$ of the a* values and the average $b^*_{Ave}$ and the minimum $b^*_{Min}$ of the b* values were determined.

[Measurement Conditions for Spectrophotometer]
field of view: 10°
light source: D65
measurement: reflection
specular component treatment: SCE
measurement area diameter: SAV (3 mm×5 mm)
UV conditions: 100% FULL
[Expression]

Characteristic Value=$-(b^*)-(a^*)$ (3) Collecting performance (properties) From five places in the width direction of a nonwoven web, measurement samples each 15 cm in length×15 cm in width were cut out, and the collecting properties and the pressure drop of each sample were determined with the collecting properties measurement device shown in FIG. 1. The collecting properties measurement device includes a sample holder 1 to hold a measurement sample M, the upstream of the sample holder 1 is connected to a dust storing box 2, and the downstream of the sample holder 1 is connected to a flow meter 3, a flow control valve 4, and a blower 5. The sample holder 1 is equipped with a particle counter 6 and the number of dust particles can be counted at each of the upstream and downstream sides of the measurement sample M by operating a switch cock 7. The sample holder 1 is also equipped with a pressure gauge 8, which can indicate the static pressure difference between the upstream side and the downstream side of the measurement sample M.

The collecting properties were determined as follows: a 10% polystyrene 0.309U solution (available from Nacalai Tesque, Inc.) was diluted to 200 times with distilled water and placed in the dust storing box 2. Next, the measurement sample M was placed in the sample holder 1. Airflow was adjusted with the flow control valve 4 so that the air passed through the filter (sample) at a velocity of 4.5 m/minute. The dust concentration was maintained at a range of 10,000 to 40,000 particles/$2.83 \times 10^{-4}$ m$^3$ (0.01 ft$^3$). The number of dust particles at the upstream side (D) and the number of dust particles at the downstream side (d) were measured for the measurement sample M using the particle counter 6 (KC-01B manufactured by RION Co., Ltd.). The measurement was repeated three times for each sample. The collecting properties (%) for particles having a diameter of 0.3 to 0.5 µm was calculated using the following expression based on JIS K 0901(1991) "Form, size and performance testing methods of filtration media for collecting airborne particulate matters". The average value from the five measurement samples was taken as a final collecting properties result.

Collecting Properties (%)=$[1-(d/D)] \times 100$ wherein d is the total of the numbers of dust particles at the downstream side in three measurements, and D is the total of the numbers of dust particles at the upstream side in three measurements.

Example 1

A melt blown nonwoven web having a mass per unit area of 25 g/m$^2$ and an average fiber diameter of 1.7 µm was produced by a melt blown method using as a raw material a polypropylene that has a melt flow rate of 800 g/10 minutes and contains 1 mass % hindered amine compound "CHIMASSORB" (registered trademark) 944 (manufactured by BASF Japan Ltd.) as a weathering agent. Subsequently, using a device in which nozzles (model number B1/8 GG-SS-1, manufactured by Spraying Systems Co., Japan) having a spraying angle of 50° C. (at a pressure of 0.6 MPa) and adapted to give a circular spray were disposed at 40 mm spacings in a staggered arrangement and which was installed such that there was a distance of 60 mm between the spouting face and the fiber sheet surface, jets of pure water were impinged on the melt blown nonwoven web at a pressure of 4.0 MPa from each of the nozzles. Then, the melt blown nonwoven web was passed through the misty water generated by the water spout, and the web was dewatered and then dried with hot air at a temperature of 100° C. for 5 minutes to thereby afford an electretized melt blown nonwoven web. The resulting electret melt blown nonwoven web was measured for collecting performance, and the web having toners attached thereto was measured for a* and b*. The average and the maximum of the characteristic values obtained from a* and b*, the average and the maximum of the a* values, the average and the minimum of the b* values, and the collecting properties are shown in Table 1.

Example 2

An electretized melt blown nonwoven web was made under the same conditions as in Example 1 except that the spraying pressure was 3.0 MPa. The resulting electret melt blown nonwoven web was measured for collecting performance, and the web having toners attached thereto was measured for a* and b*. The average and the maximum of the characteristic values obtained from a* and b*, the average and the maximum of the a* values, the average and the minimum of the b* values, and the collecting properties are shown in Table 1.

Example 3

The polypropylene used in Example 1 was used as a raw material to make an electretized melt blown nonwoven web under the same conditions as in Example 1, except that a melt blown nonwoven web having a mass per unit area of 20 g/m² and an average diameter of fiber of 2.4 μm was produced and that the spraying pressure was 2.0 MPa. The resulting electret melt blown nonwoven web was measured for collecting performance, and the web having toners attached thereto was measured for a* and b*. The average and the maximum of the characteristic values obtained from a* and b*, the average and the maximum of the a* values, the average and the minimum of the b* values, and the collecting properties are shown in Table 1.

Comparative Example 1

The melt blown nonwoven web produced in Example 1 was run on the surface of pure water supplied in a water tank while a slit-shaped suction nozzle in contact with the surface of the web was sucking the water, whereby the water permeated through the whole area of the fiber sheet, and the web was dewatered, and then dried with hot air at a temperature of 100° C. for 5 minutes to thereby afford an electretized melt blown nonwoven web. The resulting electret melt blown nonwoven web was measured for collecting performance, and the web having toners attached thereto was measured for a* and b*. The average and the maximum of the characteristic values obtained from a* and b*, the average and the maximum of the a* values, the average and the minimum of the b* values, and the collecting properties are shown in Table 1.

Comparative Example 2

Pure water was impinged at a pressure of 1.0 MPa on the whole area of a sheet as which the melt blown nonwoven web produced in Example 1 was used, using a device in which a WJP spinning nozzle having a diameter of ϕ0.13, spacings of 0.6 mm, and a spraying angle of 0° was disposed such that there was a distance of 30 mm between the spouting face and the fiber sheet surface, and the sheet was dewatered, and then dried with hot air at a temperature of 100° C. for 5 minutes to thereby afford an electretized melt blown nonwoven web. The resulting electret melt blown nonwoven web was measured for collecting performance, and the web having toners attached thereto was measured for a* and b*. The average and the maximum of the characteristic values obtained from a* and b*, the average and the maximum of the a* values, the average and the minimum of the b* values, and the collecting properties are shown in Table 1.

Comparative Example 3

An electretized melt blown nonwoven web was made under the same conditions as in Comparative Example 1 except that the melt blown nonwoven web produced in Example 3 was used. The resulting electret melt blown nonwoven web was measured for collecting performance, and the web having toners attached thereto was measured for a* and b*. The average and the maximum of the characteristic values obtained from a* and b*, the average and the maximum of the a* values, the average and the minimum of the b* values, and the collecting properties are shown in Table 1.

TABLE 1

| | | | Example 1 | Example 2 | Example 3 | Comparative Example 1 | Comparative Example 2 | Comparative Example 3 |
|---|---|---|---|---|---|---|---|---|
| Fiber Sheet | Raw Material | — | PP | PP | PP | PP | PP | PP |
| | Manufacturing Method of Fiber Sheet | — | Melt blown | Melt blown | Melt blown | Melt blown | Melt blown | Melt blown |
| | Diameter of Single Fiber | μm | 1.7 | 1.7 | 2.4 | 1.7 | 1.7 | 2.4 |
| | Mass per Unit Area of Fiber Sheet | g/m² | 25 | 25 | 20 | 25 | 25 | 20 |
| Electret Condition | Distance between Spouting Face and Sheet | mm | 60 | 60 | 60 | — (Suction Method) | 30 | — (Suction Method) |
| | Spouting Pressure | MPa | 4 | 3 | 2 | — (Suction Method) | 1 | — (Suction Method) |
| Fiber sheet properties | $[-(b^*)-(a^*)]_{Ave}$ | — | 17 | 21 | 19 | 5 | 6 | 11 |
| | $[-(b^*)-(a^*)]_{Max}$ | — | 22 | 28 | 24 | 11 | 13 | 15 |
| | $a^*_{Ave}$ | — | 8 | 5 | 8 | 14 | 12 | 12 |
| | $a^*_{Max}$ | — | 12 | 12 | 11 | 18 | 16 | 18 |
| | $b^*_{Ave}$ | — | −24 | −26 | −27 | −21 | −22 | −23 |
| | $b^*_{Min}$ | — | −26 | −29 | −28 | −19 | −19 | −25 |
| | Collecting Properties | % | 99.99 | 99.99 | 99.89 | 99.89 | 99.90 | 99.78 |

As obvious from Table 1, in all of Examples 1 to 3 of the present invention, the average of $[-(b^*)-(a^*)]_{Ave}$ the characteristic values obtained from $a^*$ and $b^*$ was 12 or more and the maximum $[-(b^*)-(a^*)]_{Max}$ was 18 or more, which was a large value, and the average $a^*_{Ave}$ and the maximum $a^*_{Max}$ of the $a^*$ values and the average $b^*_{Ave}$ and the minimum $b^*_{Min}$ of the $b^*$ values were small, and these confirm that positive polarity charge was unevenly distributed toward the surface in the fiber sheet, and represent high collecting properties.

In contrast, in Comparative Examples 1 to 3, compared with Examples 1 to 3, $[-(b^*)-(a^*)]_{Ave}$ and $[-(b^*)-(a^*)]_{Max}$ obtained from $a^*$ and $b^*$ were small, and $a^*_{Ave}$, $a^*_{Max}$, $b^*_{Ave}$, and $b^*_{Min}$ were large, showing the results that positive polarity and negative polarity charge were present in mixture in the surface of the fiber sheet and that the collecting properties were low.

REFERENCE SIGNS LIST

1: Sample holder
2: Dust storing box
3: Flow meter
4: Flow control valve
5: Blower
6: Particle counter
7: Switch cock
8: Pressure gauge
M: Measurement sample

The invention claimed is:

1. An electret fiber sheet wherein an average of $-(b^*)-(a^*)$ values satisfies the following expression:

$$12 \leq [-(b^*)-(a^*)]_{Ave} \leq 50$$

wherein $a^*$ and $b^*$ are values measured by a spectrophotometer when a red positive charge toner and a blue negative charge toner are attached,
wherein the maximum $a^*_{Max}$ of the $a^*$ values is in the range of 5 to 18 and the minimum $b^*_{Min}$ of the $b^*$ values is in the range of −40 to −20.

2. The electret fiber sheet according to claim 1, wherein the $a^*$ and the $b^*$ are such that the maximum among $-(b^*)-(a^*)$ values calculated at different points satisfies the following expression:

$$18 \leq [-(b^*)-(a^*)]_{Max}.$$

3. The electret fiber sheet according to claim 1, wherein the average $a^*_{Ave}$ of the $a^*$ values is in the range of 0 to 10 and the average $b^*_{Ave}$ of the $b^*$ values is in the range of −40 to −20.

4. The electret fiber sheet according to claim 1, wherein the electret fiber sheet is produced by an electretizing method comprising a spraying step of impinging jets of water or a stream of water droplets on a non-conductive fiber sheet.

* * * * *